United States Patent
Prasad et al.

(10) Patent No.: US 12,301,404 B2
(45) Date of Patent: May 13, 2025

(54) IN-SITU OPERATIONS, ADMINISTRATION, AND MAINTENANCE EXTENSION TO TRACE MULTICAST TREE AND IDENTIFY FAILURE NODE

(71) Applicant: Cisco Technology, Inc., San Jose, CA (US)

(72) Inventors: Mankamana Mishra Prasad, San Jose, CA (US); Nitin Kumar, San Jose, CA (US); Frank Brockners, Cologne (DE); Carlos M. Pignataro, Cary, NC (US); Rakesh Gandhi, Stittsville (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 349 days.

(21) Appl. No.: 18/065,221

(22) Filed: Dec. 13, 2022

(65) Prior Publication Data

US 2024/0195678 A1 Jun. 13, 2024

(51) Int. Cl.
  *H04L 45/16* (2022.01)
  *H04L 41/0631* (2022.01)
  *H04L 43/12* (2022.01)

(52) U.S. Cl.
  CPC ......... *H04L 41/0645* (2013.01); *H04L 43/12* (2013.01); *H04L 45/16* (2013.01)

(58) Field of Classification Search
  None
  See application file for complete search history.

(56) References Cited

U.S. PATENT DOCUMENTS

| | | | |
|---|---|---|---|
| 10,887,209 B2 | 1/2021 | Nainar et al. | |
| 2007/0268882 A1* | 11/2007 | Breslau | H04L 43/026 370/346 |
| 2009/0086666 A1* | 4/2009 | Guvenc | H04L 1/02 370/328 |

(Continued)

FOREIGN PATENT DOCUMENTS

WO  2011/160498 A1  12/2011

OTHER PUBLICATIONS

Cisco, "Configuring PIM and PIM6," Cisco Nexus 7000 Series NX-OS Multicast Routing Configuration Guide, Mar. 2020, 74 pages.

(Continued)

*Primary Examiner* — Angela Nguyen
(74) *Attorney, Agent, or Firm* — Edell, Shapiro & Finnan, LLC

(57) ABSTRACT

A method is performed by a network controller that is configured to control routers configured to forward a multicast flow downstream from a first hop router that is a root of a multicast tree formed by the routers to last hop routers that terminate branches of the multicast tree, respectively. The method includes collecting operational configuration information from the routers and constructing a topological view of the multicast tree based on the operational configuration information; causing the routers to forward multicast probes downstream from the first hop router along all of the branches toward the last hop routers to trace the multicast tree; receiving, from particular ones of the last hop routers that received the multicast probes, indications that the multicast probes were received; and detecting failures in the multicast tree based on the indications and the topological view.

20 Claims, 10 Drawing Sheets

(56) References Cited

U.S. PATENT DOCUMENTS

| | | | |
|---|---|---|---|
| 2010/0333160 A1* | 12/2010 | Flinta | H04N 21/2402 |
| | | | 725/116 |
| 2012/0188909 A1 | 7/2012 | Previdi et al. | |
| 2017/0187608 A1 | 6/2017 | Nevrekar et al. | |
| 2020/0145318 A1 | 5/2020 | Nainar et al. | |
| 2020/0162307 A1 | 5/2020 | Chen | |
| 2023/0336450 A1* | 10/2023 | Filsfils | H04L 45/741 |

OTHER PUBLICATIONS

Cisco, "Monitoring with the Multicast Manager Tool," Chapter 3, User Guide for Cisco Multicast Manager 2.4, Jun. 2007, 18 pages.

Asaeda, et al., "Mtrace Version 2: Traceroute Facility for IP Multicast," Internet Engineering Task Force (IETF), Request for Comments: 8487, Oct. 2018, 41 pages.

Senevirathne, et al., "IP multicast data plane failure detection," Internet Engineering Task Force (IETF), Network Working Group, Internet Draft, Mar. 2012, 19 pages.

Saxena, et al., "Detecting Data-Plane Failures in Point-to-Multipoint MPLS—Extensions to LSP Ping," Internet Engineering Task Force (IETF), Request for Comments: 6425, Nov. 2011, 28 pages.

\* cited by examiner

IN-SITU OPERATIONS, ADMINISTRATION, AND MAINTENANCE EXTENSION TO TRACE MULTICAST TREE AND IDENTIFY FAILURE NODE

TECHNICAL FIELD

The present disclosure relates generally to tracing multicast flows in a network.

BACKGROUND

Multicast technology is used for financial, Internet Protocol (IP), and television services, and for surveillance networks. A challenge presented by multicast technology is identifying possible problems in a multicast network. On one hand, customers seek a tool that is simple to use to trace a multicast route from a multicast source to multicast receivers in the multicast network. On the other hand, enterprise customers and service providers that operate multicast networks face a growing challenge when monitoring and debugging the multicast networks on a large scale, given that the multicast networks can carry hundreds of thousands or even millions of multicast flows at any given time. Moreover, tracing a multicast routing tree (referred to simply as a "multicast tree") hop-by-hop in a downstream direction from a multicast source to multicast receivers is difficult because there is no efficient and deterministic way to determine the branches of the multicast tree on which the receivers lie. For example, existing trace tools may only trace one leg of the multicast tree.

DETAILED DESCRIPTION

Overview

In an embodiment, a method is performed by a network controller that is configured to control routers configured to forward a multicast flow downstream from a first hop router that is a root of a multicast tree formed by the routers to last hop routers that terminate branches of the multicast tree, respectively. The method includes collecting operational configuration information from the routers and constructing a topological view of the multicast tree based on the operational configuration information; causing the routers to forward multicast probes downstream from the first hop router along all of the branches toward the last hop routers to trace the multicast tree; receiving, from particular ones of the last hop routers that received the multicast probes, indications that the multicast probes were received; and detecting failures in the multicast tree based on the indications and the topological view.

Example Embodiments

Embodiments presented herein provide full tracing of a multicast tree hop-by-hop in a downstream direction from a multicast source to all multicast receivers. The embodiments determine failures at specific hops or nodes (e.g., routers) along the multicast tree. Moreover, the embodiments are scalable and may be implemented on-demand. The embodiments may be implemented as in-situ operations, administration, and maintenance (IOAM) methods. The IOAM methods may be further implemented as extensions or improvements to existing IOAM multicast trace methods.

Figure 1:
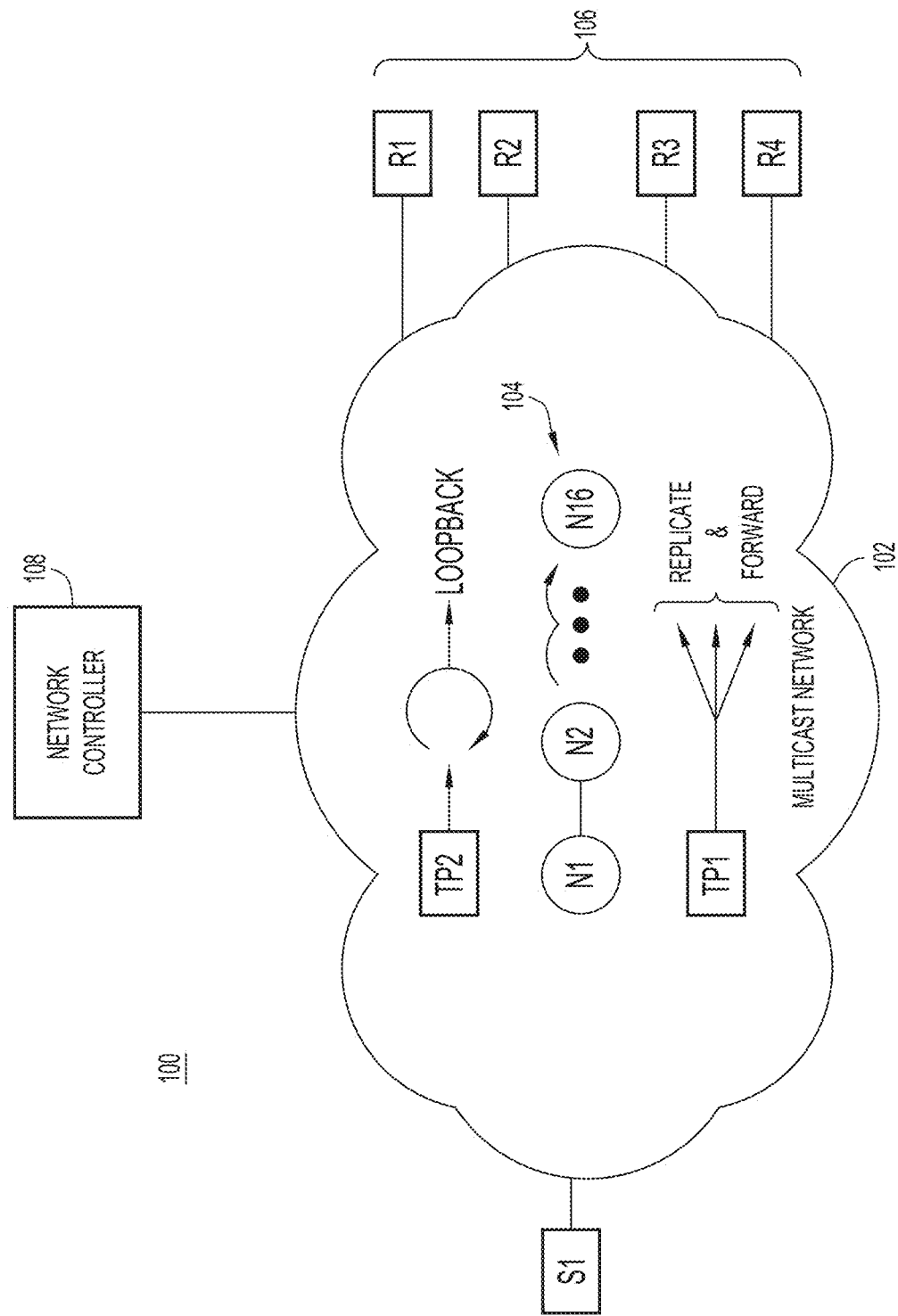
FIG. 1 is a block diagram of a network environment in which embodiments directed to multicast tracing may be implemented, according to an example embodiment.

With reference to FIG. 1, there is a block diagram of an example network environment 100 in which embodiments directed to multicast tracing may be implemented. Network environment 100 includes a multicast network 102 comprising routers N1-N16 (collectively referred to as routers 104) connected to each other over various network links (not shown). More generally, routers 104 represent network devices or nodes, such as routers, switches, and the like, that may be implemented in hardware or virtually, e.g., as network device applications hosted on servers. Multicast network 102 may include, and/or be connected to, local area networks (LANs) and/or wide area networks (WANs), such as the Internet. Routers 104 are configured for routing/forwarding of multicast flows, and may be referred to as "multicast routers." Network environment 100 includes a multicast source S1 of multicast traffic and receivers R1, R2, R3, and R4 (collectively referred to as receivers 106) of the multicast traffic all connected to multicast network 102. Multicast source S1 and receivers 106 represent external equipment, such as user equipment or client devices, connected to multicast network 102.

Network environment 100 also includes a network controller 108 connected to multicast network 102. Network controller 108 is configured to control routers 104 over various control links. Network controller 108 controls routers 104 to perform tracing and validating of a topology of multicast network 102 according to embodiments presented herein. To this end, network controller 108 is configured to command multicast source S1 and routers 104 to (i) propagate a "replicate and forward" multicast probe TP1 (and replicated or copied versions thereof) across multicast network 102, (ii) propagate a "loopback" multicast probe TP2 across the multicast network, and (iii) monitor results reported by the routers in response to propagating the multicast probes, as described below. In some embodiments, multicast probes TP1 and TP2 may be represented by a common or single type of multicast probe. A "probe" may also be referred to as a "probe packet" or a "trace packet."

Figure 2:
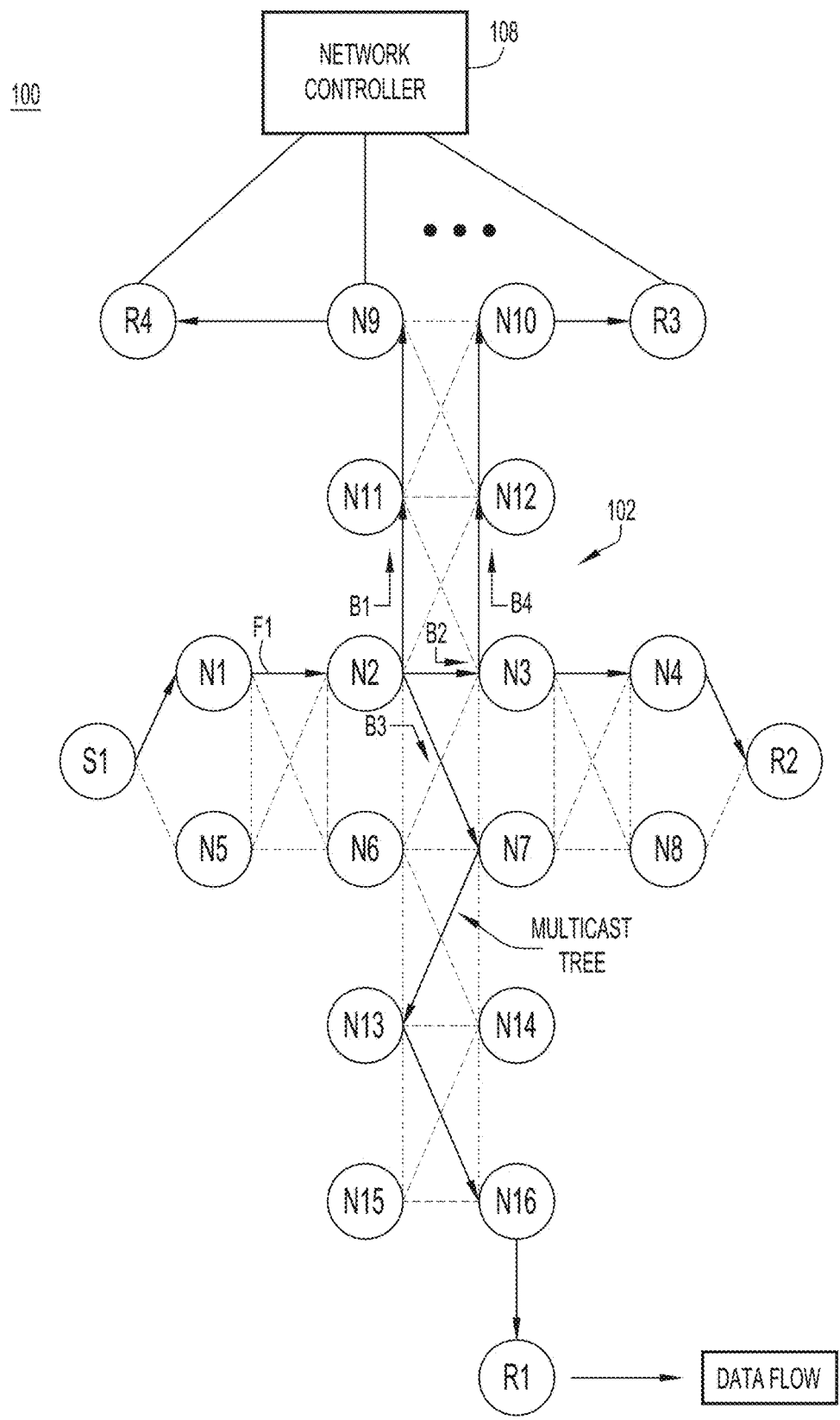
FIG. 2 is a diagram of a topology of a multicast network, according to an example embodiment.

FIG. 2 is a diagram of an example of multicast network 102 in which adjacent pairs of routers 104 have multiple connections to each other to form the topology as shown. Routers 104 include routers N1, N2, N3, N4, N5, N6, N7, N8, N9, N10, N11, N12, N13, N14, N15, and N16, although more or less routers may be employed. Generally, routers 104 forward multicast traffic or flows from multicast source S1 to one or more of receivers R1-R4 along multicast paths. A multicast flow is identified by a pair or tuple (source address (S), group address (G)), which forms an identifier (ID) of the multicast flow. In the example of FIG. 2, multicast source S1 (with source address S) originates a multicast flow F1 (S1, G) of IP traffic (i.e., multicast packets) destined for receivers R1-R4 (which belong to group address G). Router N1 is a first hop router connected to multicast source S1, routers N16, N4, N10, and N9 are last hop routers connected to receives R1. R2, R3, and R4, respectively, and routers that connect the first hop router to the last hop routers are referred to as transit routers (e.g., router N2, N11, N9, and so on).

In the example of FIG. 2, multicast network 102 includes a multicast tree (depicted with solid-lined arrows) rooted at multicast source S1 for forwarding multicast flow F1 (S1, G) from the multicast source to receivers R1-R4. Multicast flow F1 (S1, G) flows in a downstream direction from multicast source S1 to receivers R1-R4 in a sequence of hops (i.e., hop-by-hop) via the routers of the multicast tree. The multicast tree includes first hop router N1, last hop routers N9, N4, N16, and N10, and intermediate transit routers that collectively forward multicast flow F1 (S1, G). Multicast source S1/router N1 may be considered a root of the multicast tree and receivers/routers R4/N9, R2/N4, R1/N16, and R3/N10 terminate branches B1, B2, B3, and B4 of the multicast tree, respectively (and thus forms leaves of the multicast tree). Router N2 is connected to next hop routers N11, N3, and N7 in parallel to form branches B1, B2, and B3, for example. Routers N11, N3, and N7 are considered immediate next hop routers with respect to router N2. Given the downstream direction of multicast flow, router N2 is considered upstream from router N3, which is considered downstream from router N2.

Network controller 108 communicates with routers 104 to collect operational information from routers 104, and to construct topology views of multicast network 102. For example, network controller 108 sends to routers 104 respective requests for information that defines configurations of the routers. The information may include control plane and data plane information that represent operational router configurations including routing and forwarding tables, control plane states, interface configurations, and so on. In response, routers 104 send respective responses that indicate the operational router configurations. The information collected from routers 104 expose a topology (e.g., a multicast forwarding topology) of the routers. Accordingly, network controller 108 can construct a topological view of multicast network 102 based on the collected information, as shown in FIG. 3.

Figure 3:
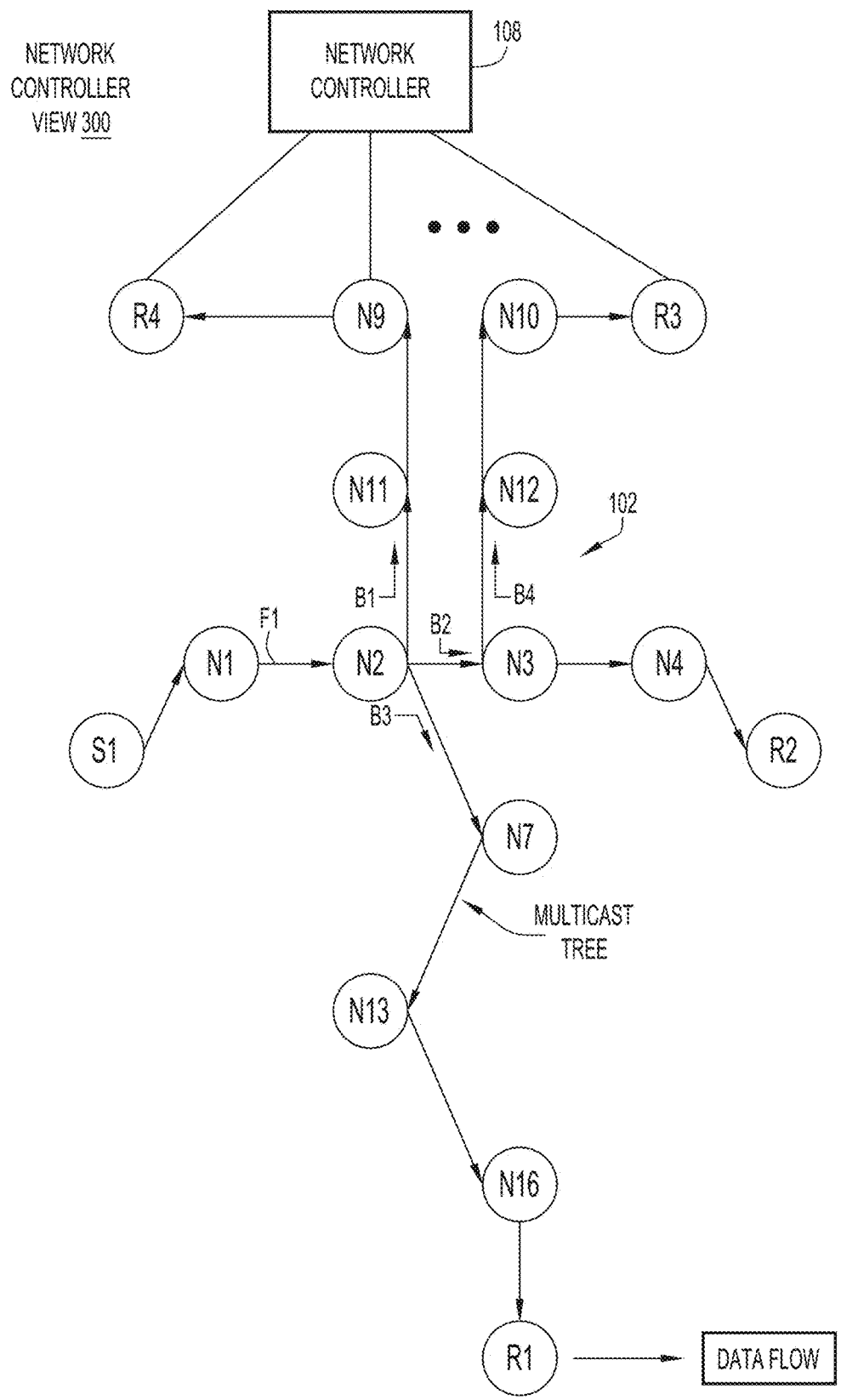
FIG. 3 is a diagram of a network controller view of a multicast tree in the multicast network, according to an example embodiment.

FIG. 3 is a diagram of an example network controller view 300 (also referred to as a "topological view") of the multicast tree in multicast network 102 rooted at multicast source S1/router N1 for multicast flow F1 (S1, G) as constructed by network controller 108, based on the information collected from routers 104. The network controller view 300 exposes the full multicast tree including the first hop router (e.g., router N1), the transit routers, and the lost hop routers (e.g., routers N16, N4, N10, and N9).

Figure 4:
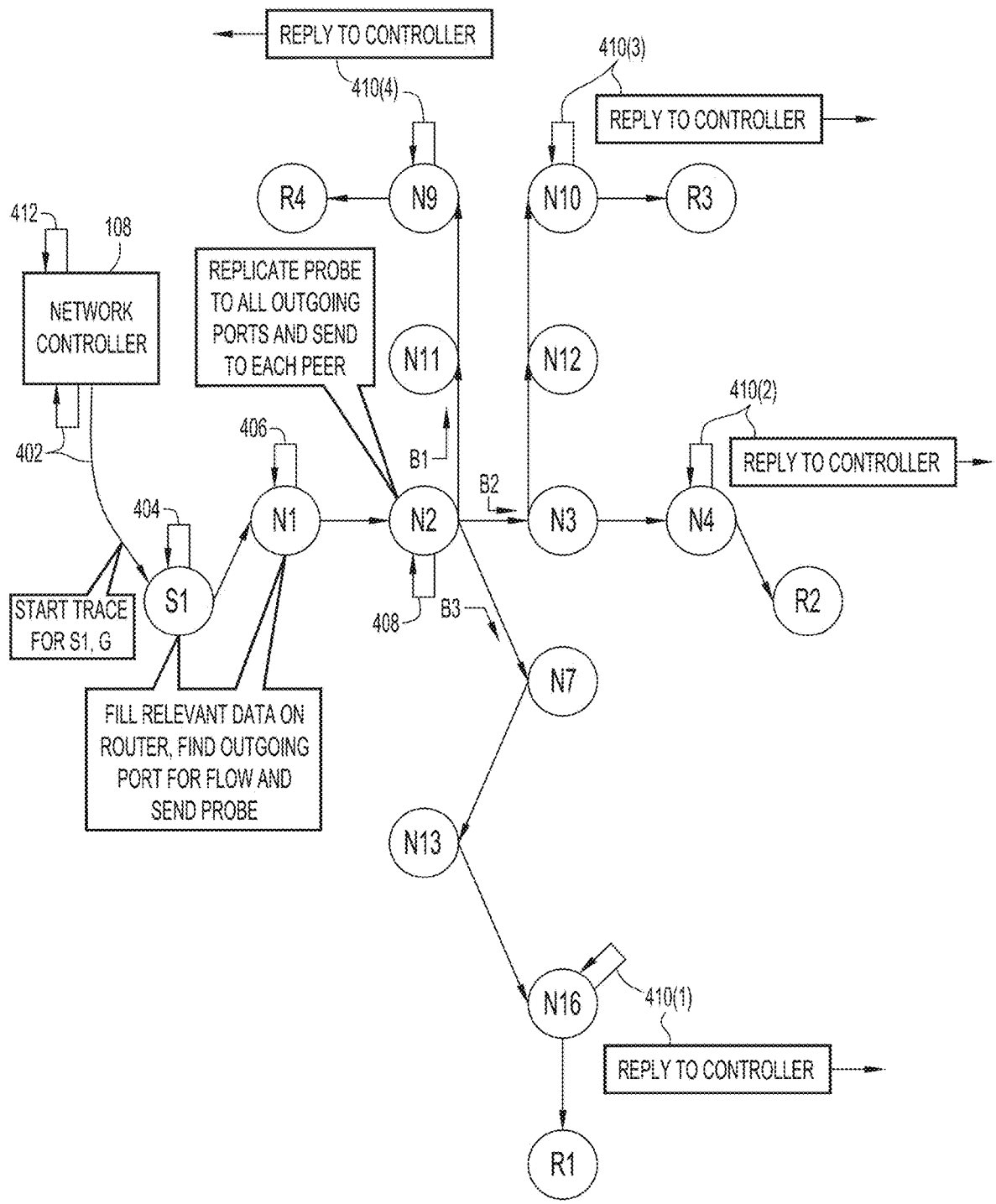
FIG. 4 is a diagram of a method of performing a trace of the multicast tree using replicate and forward multicast probes forwarded along the multicast tree, according to an example embodiment.

FIG. 4 is a diagram of an example method 400 of performing a trace of the multicast tree using replicate and forward multicast probes forwarded as multicast packets along the multicast tree in the downstream direction. Method 400 validates the multicast tree from end-to-end, i.e., from the first hop router to the last hop or terminal routers.

At 402, network controller 108 receives a customer request to trace multicast flow F1 (S1, G) and commands multicast source S1 (or first hop router N1) to start a trace of the multicast tree. Either network controller 108 or multicast source S1 creates/instantiates a replicate and forward multicast probe (also referred to simply as the "multicast probe" in connection with FIG. 4) for multicast flow (S1, G). The multicast probe may be configured as a multicast packet having (i) a type field uniquely encoded to indicate that the multicast packet is a replicate and forward multicast probe, (ii) the multicast flow ID (S1, G), and (iii) identifiers/definitions of which local router information is to be collected from each router at each hop (i.e., per hop) and stored in the multicast probe. Such local router information may include packet counts for incoming and outgoing router interfaces/ports, protocol timers, and so on. When network controller 108 creates the multicast probe, the network controller sends the multicast probe to multicast source S1.

At 404, multicast source S1 receives the multicast probe. Multicast source S1 populates the multicast probe with information about the multicast source (which can include router information in an example in which multicast source includes router capabilities). After populating the multicast probe with the information about multicast source S1, the multicast source forwards the multicast probe (as updated) to the next hop router (router N1) in the downstream direction via an outgoing interface or port of the multicast source. The multicast probe is forwarded as a multicast packet.

In an alternative to the above-described process, multicast source S1 or first hop router N1, rather than network controller 108, may instantiate the multicast probe. For example, network controller 108 may command multicast source S1 or first hop router N1 to originate the multicast probe.

At 406, router N1 receives the multicast probe from multicast source S1. Upon receiving the multicast probe, router N1 performs the following operations:

a. Populate the multicast probe with (local) router information for the router. This produces an updated version of the multicast probe (i.e., an updated multicast probe).

b. Determine a number M of next hop routers to which the router is directly connected in the downstream direction. These are referred to as immediate next hop routers.

c. When M>1 (i.e., the router is connected to multiple next hop routers), replicate the (updated) multicast probe M times to produce M replicas of the multicast probe (i.e., produce M replica multicast probes). Forward the M replicas to corresponding ones of the M next hop routers. In this case M=1, so flow proceeds to next operation (d), without replicating.

d. When M=1 (i.e., the router is connected to only one next hop router), forward the multicast probe to the next hop router. In this case, M=1, so router N1 simply forwards the multicast probe (as updated) to router N2.

The multicast probe is forwarded as a multicast packet.

At 408, router N2 receives the multicast probe from router N1. Router N1 is referred to as an upstream/previous hop router with respect to router N2. Upon receiving the multicast probe, router N2 performs/repeats operations (a)-(d) as performed by router N1. For example, at (a), router N2 further populates the multicast probe with local router information for router N2. At (b), router N2 determines that it is connected to 3 next hop routers N11, N3, and N7 that respectively head or start branches B1, B2, and B3 of the multicast tree. Accordingly, at (c), router N2 replicates the (updated) multicast probe 3 times to produce 3 replica multicast probes. Router N2 forwards the replica multicast probes to corresponding ones of routers N11, N3, and N7 (i.e., to downstream next hop peers).

Upon receiving respective replica multicast probes, routers N11, N3, and N7 repeat operations (a)-(d) to forward their own replica multicast probes to next hop routers, as needed. The aforementioned replicate and forward process repeats hop-by-hop at each of the next hop routers as the multicast probes and/or replica multicast probes propagate along remaining hops of the multicast tree toward last hop routers N16, N4, N10, and N9. The replicate and forward process ensures that all branches of the multicast tree are transited by multicast probes (or replicas thereof).

Upon receiving the multicast probes/replicas, at 410(1), 410(2), 410(3), and 410(4), routers N16, N4, N10, and N9 (i.e., the last hop routers) send respective replies or reports to network controller 108 indicating receipt of respective multicast probes/replicas.

Upon receiving the replies, at 412, network controller 108 validates the multicast tree from multicast source S1 to receivers R1-R4 based on (i) the last hop router replies indicating successful receipt of the multicast probes/replicas, and (ii) network controller view 300 accessible to the network controller. For example, network controller 108 determines whether each last hop router indicated in network controller view 300 reported receipt of a corresponding multicast probe/replica as indicated in the replies. When all of the last hop routers received corresponding multicast probes/replicas, the multicast tree is successfully validated. When any of the last hop routers did not receive corresponding multicast probes/replicas, the multicast tree fails validation.

Figure 5:
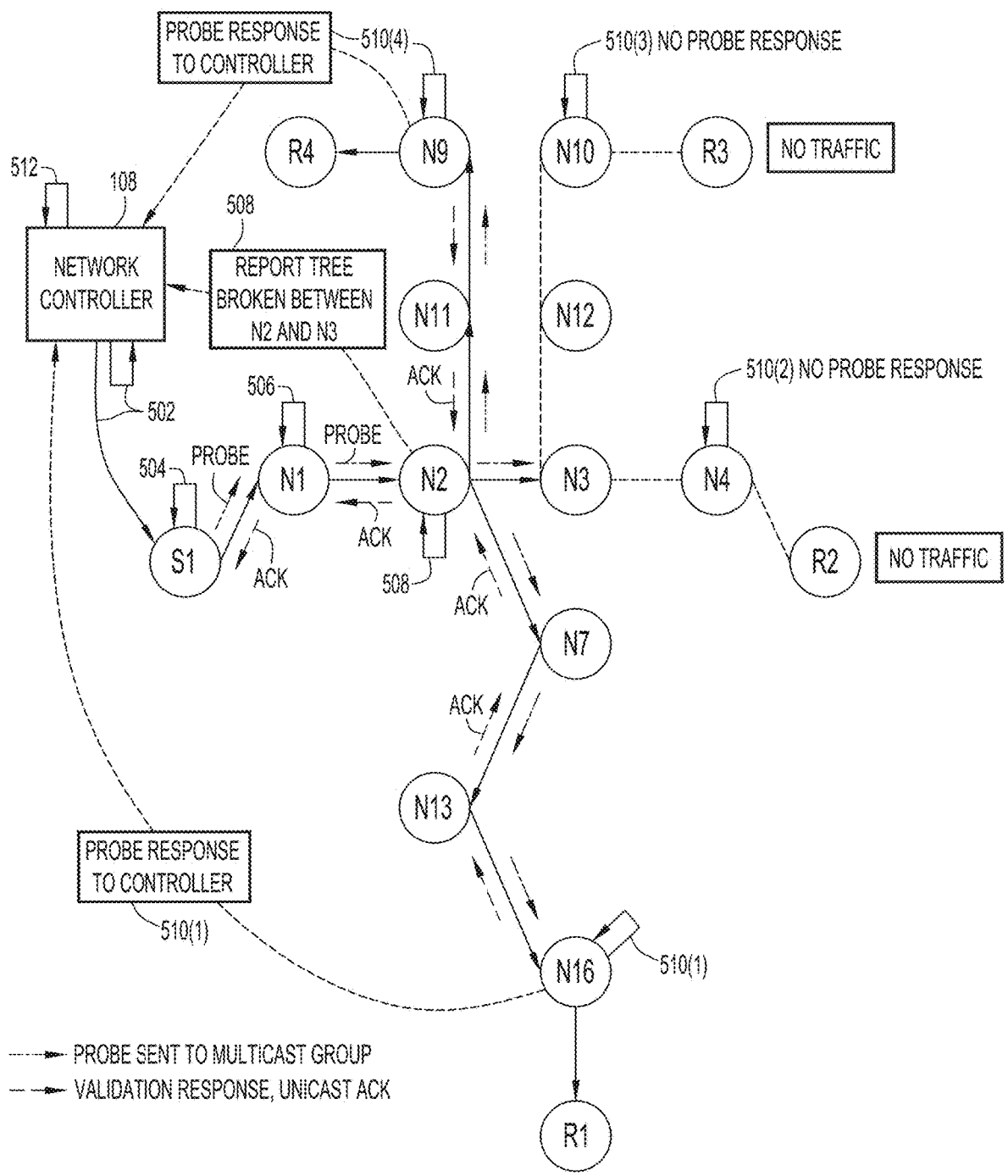
FIG. 5 is a diagram of a method of performing a trace of the multicast tree using loopback multicast probes forwarded along the multicast tree, according to an example embodiment.

FIG. 5 is a diagram of a method 500 of validating the multicast tree hop-by-hop using loopback multicast probes forwarded along the multicast tree in the downstream direction. Method 500 advantageously identifies a failure to a specific hop, e.g., to a specific router or link between peer routers in the multicast tree.

At 502, network controller 108 commands multicast source S1 to start a trace of the multicast tree. Either network controller 108 or multicast source S1 creates/instantiates a loopback multicast probe for multicast flow (S1, G). The loopback multicast probe may be configured as a multicast packet having (i) a type field uniquely encoded to indicate that the multicast packet is a loopback multicast probe, (ii) the multicast flow ID (S1, G), (iii) identifiers/definitions of which local router information is to be collected from each router at each hop (i.e., per hop) and stored in the multicast probe, and (iv) a loopback address set to an address (e.g., an IP address) of multicast source S1. When network controller 108 creates the loopback multicast probe, the network controller sends the loopback multicast probe to multicast source S1.

Upon receiving the loopback multicast probe, at 504, multicast source S1 performs the following operations:

a. Populate the loopback multicast probe with information for multicast source S1, and with a loopback address set to the address of multicast source S1 (if the loopback address is not already set to that address). The loopback address is included prior to forwarding the loopback multicast probe to a next hop.

b. Forward the loopback multicast probe (as updated at (a)) to next hop router N1. Start a wait timer that counts out a predetermined wait time in which to receive an acknowledgement (ACK) from router N1. The ACK indicates that router N1 received the loopback multicast probe.

c. When the ACK is received within the predetermined wait time, reset the wait time (i.e., reset the wait timer), and take no further action. In the example of FIG. 5, multicast source S1 receives the ACK within the wait time, so the multicast source simply resets the wait time.

d. When the ACK is not received within the wait time (which is not the situation in the example of FIG. 5), reset the wait time, and send a failure report to network controller 108 indicating that the ACK was not received from router N1 (i.e., the failure report identifies the downstream next hop router that failed to acknowledge the loopback multicast probe).

Upon receiving the loopback multicast probe forwarded by multicast source S1, at 506, router N1 performs the following operations similar to those performed by the multicast source:

a. Send an ACK to multicast source S1, i.e., to the loopback address stored in the loopback multicast probe. The ACK may be forwarded upstream as a unicast packet.

b. Populate the loopback multicast probe with information for router N1, and with a new loopback address set to the address of router N1.

c. Forward the loopback multicast probe as updated at (b) to next hop router N2. Start a wait time to receive an ACK from router N2.

d. When the ACK is received within the wait time (which is in the situation in the example of FIG. 5), reset the wait time, and take no further action.

e. When the ACK is not received within the wait time (which is not the situation in the example of FIG. 5), reset the wait time, and send a response or failure report to network controller 108 indicating that the ACK was not received from router N2.

Upon receiving the loopback multicast probe forwarded by router N1, at 508, router N2 repeats the operations performed by router N1, except that router N2 performs a replicate and forward operation, as described above in connection with FIG. 4. For example, router N2 performs the following operations:

a. Send an ACK to router N1 (i.e., send the ACK in the upstream direction to the previous hop router).

b. Populate the loopback multicast probe with information for router N2, and with a new loopback address set to the address of router N2.

c. Because router N2 is connected to multiple next hop routers, replicate the loopback multicast probe to produce multiple replicas of the loopback multicast probe, forward each replica to a respective one of next hop routers N7, N3, and N11, and start a respective wait time to receive a respective ACK from each of the next hop routers.

d. When the respective ACKs are received within the respective wait times, reset the wait times, and take no further action. In the example of FIG. 5, timely ACKs are received from next hop routers N7 and N11, so router N2 resets their respective wait times and takes no further action with respect to those next hop routers.

e. When a respective ACK is not received within the wait time, reset the respective wait time corresponding to the respective ACK that was not received, and send a failure report to network controller 108 indicating which next hop router did not send its respective ACK. In the example of FIG. 5, a timely ACK is not received from next hop router N3, so router N2 sends a failure report to network controller 108 indicating that next hop router N3 did not send an ACK. That is, the multicast tree is broken between router N2 and router N3.

The aforementioned process repeats hop-by-hop at each of the next hop routers as the loopback multicast probes (or their replicas) propagate in the downstream direction, along remaining hops of the multicast tree that are not broken, toward last hop routers N16, N4, N10, and N9. When any router N1 fails to receive an ACK (in the upstream direction) from the next hop router in response to sending a loopback multicast probe (or replica thereof) to the next hop router, the router N1 sends a failure report to network controller 108.

Upon receiving the loopback multicast probes or their replicas, at 510(1), 510(2), 510(3), and 510(4), last hop routers N16, N4, N10, and N9 send respective replies to network controller 108 indicating receipt of respective loopback multicast probes/replicas. In the example of FIG. 5, last hop routers N4 and N10 do not receive loopback multicast probes/replicas due to the broken link between routers N2 and N3, so routers N4 and N10 do not send replies to network controller 108.

At 512, network controller 108 determines hop-by-hop failures of the multicast tree based on the above-described failure reports and replies received from the routers of the multicast tree.

The embodiments presented above may be implemented as an extended or improved version of existing IOAM methods, such as an IP multicast traceroute (Mtrace) application, Mtrace version 2 (V2) (Mtrace V2 or "Mtrace2") defined in IEFT RFC 8487. Mtrace2 defines a basic multicast tracing framework implemented primarily on routers. In the extended version, the network controller may send an Mtrace query packet to either the multicast source or the first hop router (or any of the routers 104) to initiate a trace of the multicast tree. When initiated at the multicast source, the query packet follows next hops toward the receivers. Each hop that receives the query packet, and that feeds multiple next hops/branches, generates multiple copies of the query packet, and then forwards the multiple copies to the next hops/branches.

Another extended version may implement the multicast loopback process.

The extension creates a multicast probe with a loopback address included in the multicast probe. Hop-by-hop, each router that receives the loopback multicast probe sends an ACK to the loopback address (of the upstream router) that sent the loopback multicast probe.

The loopback multicast probe may include an "IOAM flag=active" (to signal active probing) and a flag to indicate "multicast loopback in case of forwarding failure."

A router which receives the loopback multicast probe forwards the probe as any other multicast packet. When there is a failure, the router sends, toward the multicast source, a reply (using a revere path forwarding (PRF) route, for example) including (i) indicators of the issue and on which outgoing interface/towards which leaf the issue existed, and (ii) an indication that the reply is a "loopedback" packet.

Figure 6:
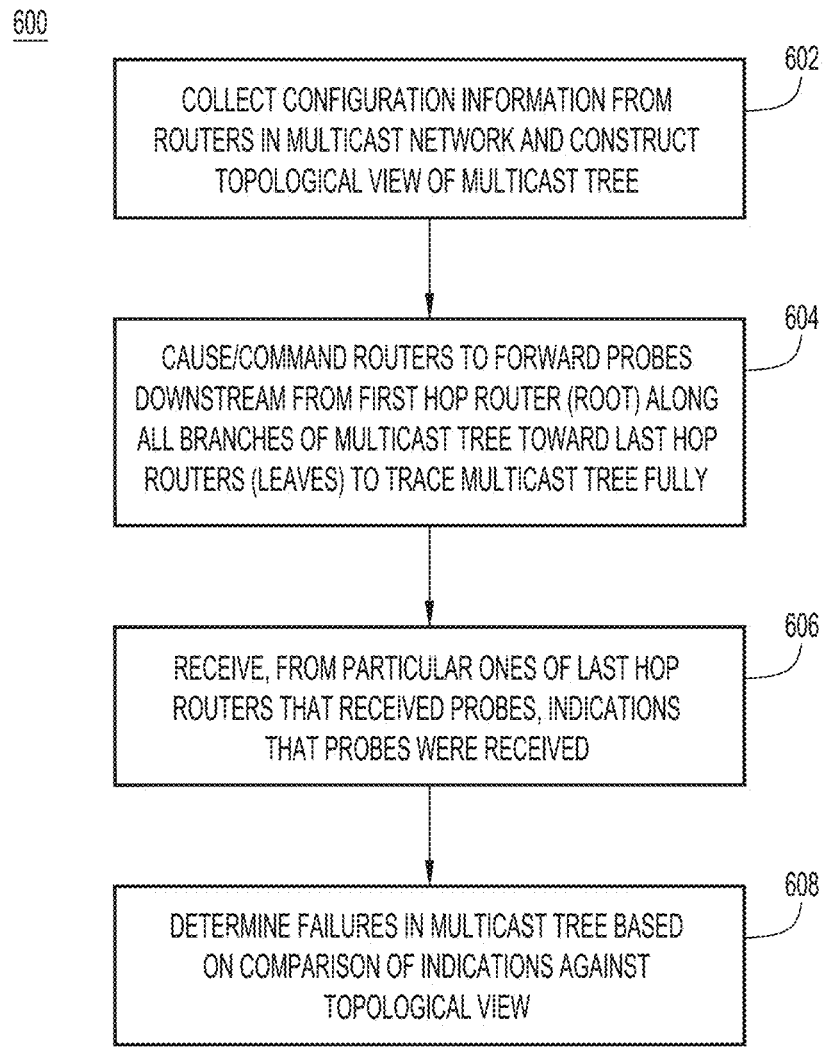
FIG. 6 is a high-level flowchart of a method of tracing a multicast tree, according to an example embodiment.

FIG. 6 is a flowchart of an example method 600 of tracing a multicast tree in a multicast network. Method 600 may be performed primarily by a network controller configured to control routers connected to form the multicast tree. The routers are configured to forward a multicast flow downstream from a first hop router that is a root of the multicast tree to last hop routers that terminate branches of the multicast tree, respectively.

At 602, the network controller collects operational configuration information from the routers and constructs a topological view of the multicast tree based on the operational configuration information.

At 604, the network controller causes the routers to forward multicast probes downstream from the first hop router along all of the branches toward the last hop routers to trace the multicast tree, fully. The network controller may command a multicast source connected to the first hop router, or the first hop router, to initiate the trace.

At 606, the network controller receives, from particular ones of the last hop routers that received the multicast probes, indications that the multicast probes were received.

At 608, the network controller determines/detects whether there are failures in the multicast tree based on the indications and the topological view. In other words, the network controller performs detecting failures in the multicast tree.

Figure 7:
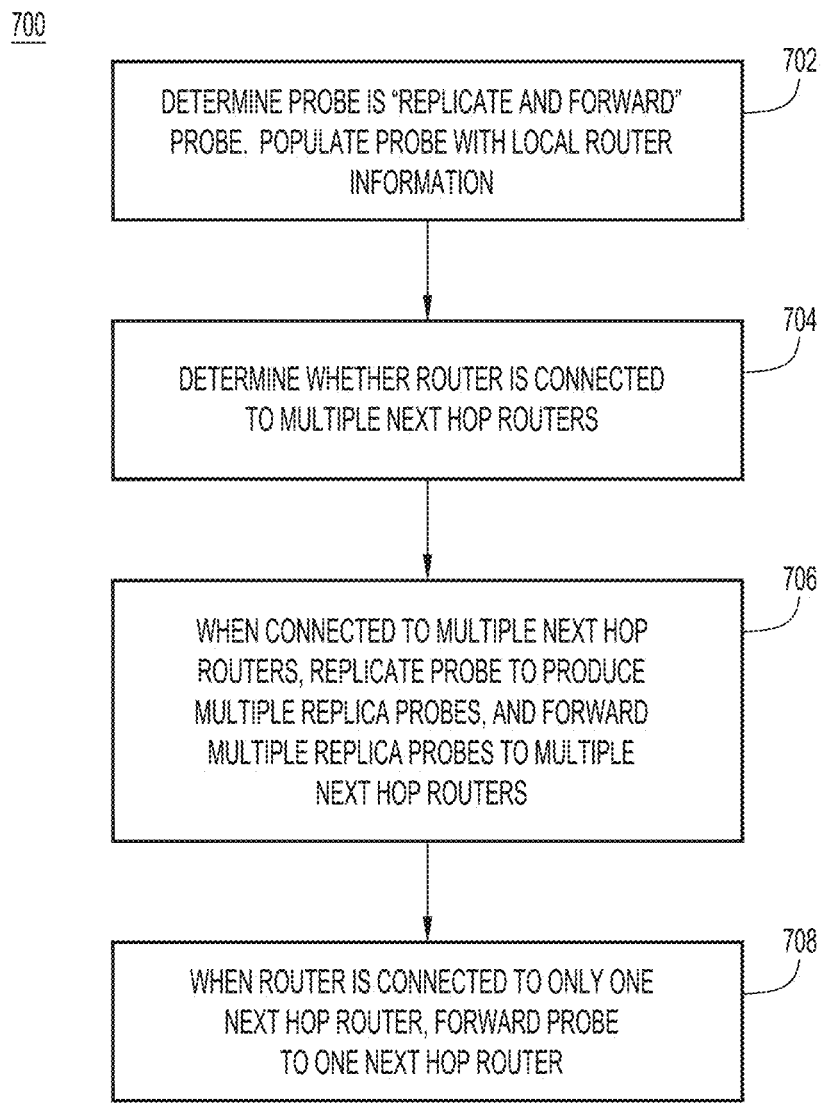
FIG. 7 is a flowchart of a method of tracing the multicast tree using a replicate and forward multicast probe that transits a router of the multicast tree, according to an example embodiment.

FIG. 7 is a flowchart of an example method 700 of tracing at least a portion of the multicast tree using a replicate and forward multicast probe (of the multicast probes from FIG. 6) that transits a router in the multicast tree. The replicate and forward multicast probe is configured to cause the router to perform method 700, and the router is configured to perform the method responsive to receipt of the replicate and forward multicast probe.

At 702, upon receiving the multicast probe, the router determines that the multicast probe is configured as the replicate and forward multicast probe based on a probe type encoded into the multicast probe. The router populates the multicast probe with local router information.

At 704, the router determines whether that the router is connected to multiple next hop (downstream) routers that start multiple branches of the multicast tree.

At 706, when the router is connected to multiple next hop routers, the router replicates the multicast probe to produce multiple replica multicast probes, and forwards the multiple replica multicast probes to corresponding ones of the multiple next hop routers to propagate the multiple replica multicast probes along the branches toward the last hop routers.

At 708, when the router is connected to only one next hop router, the router simply forwards the multicast probe (or a copy/replica thereof) to the one next hop router.

Figure 8:
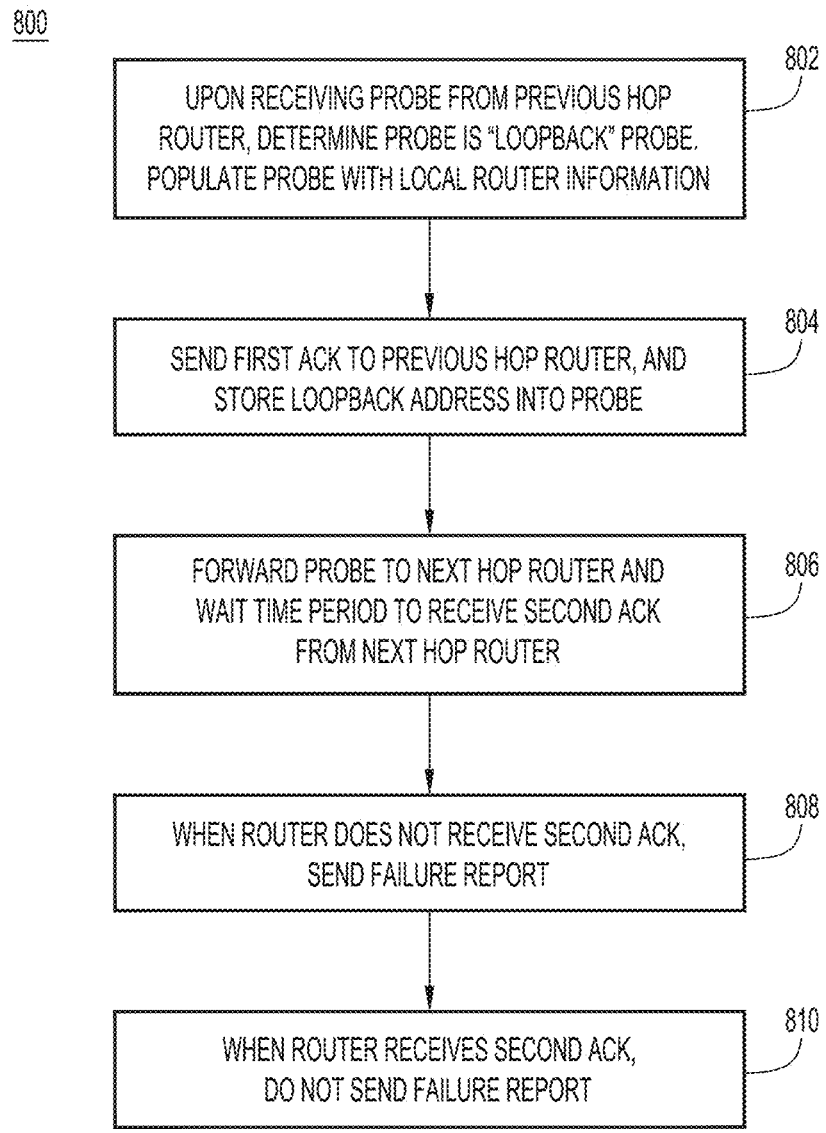
FIG. 8 is a flowchart of a method of tracing the multicast tree using a loopback multicast probe that transits a router of the multicast tree, according to an example embodiment.

FIG. 8 is a flowchart of an example method 800 of tracing at least a portion of the multicast tree using a loopback multicast probe (among the multicast probes of method 600) transited by a router in the multicast tree. The loopback multicast probe is configured to cause the router to perform method 800, and the router is configured to perform the method responsive to receipt of the loopback multicast probe.

At 802, upon receiving the multicast probe, the router determines that the multicast probe is configured as the loopback multicast probe based on a probe type encoded into the multicast probe. The router populates the multicast probe with local router information.

At 804, the router sends, to an upstream previous hop router, a first ACK indicating that the loopback multicast probe was received by the router. The address of the previous hop router is a loopback address (e.g., an IP address) specified in the loopback multicast probe, i.e., the initial loopback address is the address of the previous hop router to which the first ACK is to be sent. The router stores its own loopback address (to be used by a next hop router) in the loopback multicast probe.

At 806, the router forwards the loopback multicast probe to the next hop router, and waits a predetermined time period to receive, from the next hop router, a second ACK indicating that the next hop router received the loopback multicast probe.

When the router does not receive the second ACK within the predetermined time period, at 808, the router sends, to a network controller, a failure report indicating that the next hop router failed to send the second ACK.

When the router receives the second ACK within the predetermined time period, at 810, the router does not send the failure report.

Figure 9:
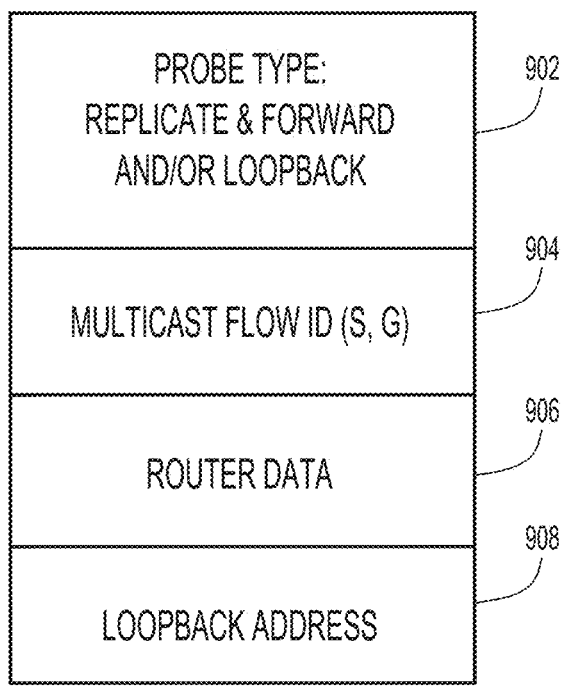
FIG. 9 is an illustration of a multicast probe, according to an example embodiment.

FIG. 9 is an illustration of an example multicast probe 900 according to embodiments presented herein. Multicast probe 900 includes a probe type 902 that is a value to indicate whether the multicast probe is a replicate and forward and/or a loopback multicast probe. In some embodiments, a single value may indicate multicast probe 900 is both types, in which case a router transited by the multicast probe will be triggered to perform replicate and forward operations and loopback operations. Multicast probe 900 includes a multicast flow ID (S, G) 904, local router information 906 collected by the router transited by the multicast probe, and an optional loopback address 908. Multicast probe 900 may include more or less fields in other examples.

Figure 10:
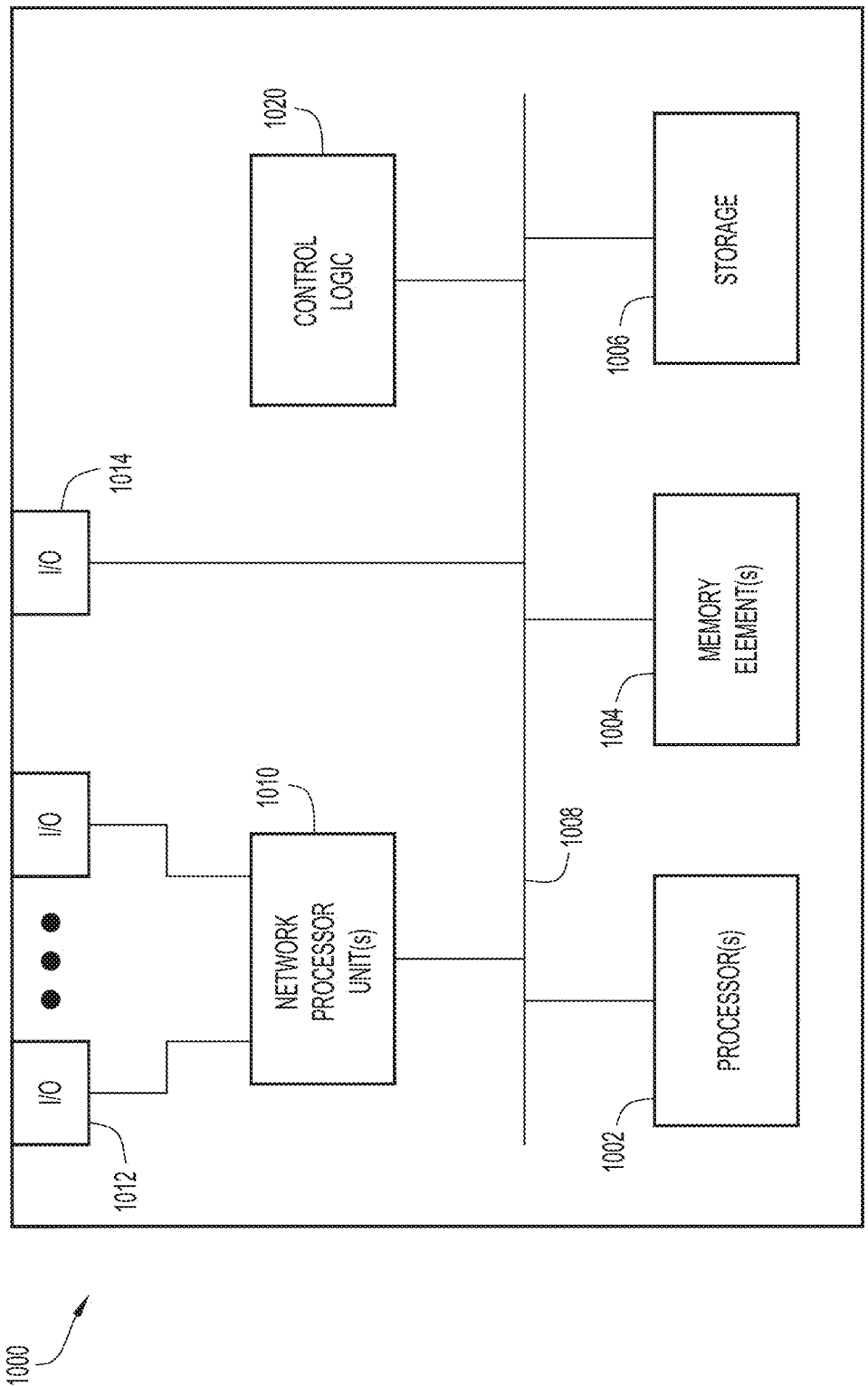
FIG. 10 is a hardware block diagram of a computing device that may perform functions associated with operations performed in connection with embodiments presented herein, according to an embodiment.

FIG. 10 is a hardware block diagram of a computing device 1000 that may perform functions associated with operations discussed herein in connection with the techniques depicted in FIGS. 1-9. In various embodiments, a computing device or apparatus, such as computing device 1000 or any combination of computing devices 1000, may be configured as any entity/entities as discussed for the techniques depicted in connection with FIGS. 1-9 in order to perform operations of the various techniques discussed herein. Computing device 1000 may represent each of the network controller, the routers, the multicast source, and the multicast receivers described above.

In at least one embodiment, the computing device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, in some aspects, the techniques described herein relate to a method including: at a network controller that is configured to control routers configured to forward a multicast flow downstream from a first hop router that is a root of a multicast tree formed by the routers to last hop routers that terminate branches of the multicast tree, respectively: collecting operational configuration information from the routers and constructing a topological view of the multicast tree based on the operational configuration information; causing the routers to forward multicast probes downstream from the first hop router along all of the branches toward the last hop routers to trace the multicast tree; receiving, from particular ones of the last hop routers that received the multicast probes, indications that the multicast probes were received; and detecting failures in the multicast tree based on the indications and the topological view.

In some aspects, the techniques described herein relate to a method, wherein the multicast probes include a multicast probe that, upon transiting a router of the routers, causes the router to perform: upon determining that the router is connected to multiple next hop routers among the routers that start the branches of the multicast tree, replicating the multicast probe to produce multiple replica multicast probes of the multicast probes; and forwarding the multiple replica multicast probes to corresponding ones of the multiple next hop routers to propagate the multiple replica multicast probes along the branches toward the last hop routers.

In some aspects, the techniques described herein relate to a method, further including: at the network controller, commanding the first hop router or a multicast source of the multicast flow that is connected to the first hop router to originate the multicast probe, wherein forwarding the multicast probe includes forwarding the multicast probe from the first hop router toward the branches.

In some aspects, the techniques described herein relate to a method, wherein a multicast probe among the multicast probes is configured as a loopback multicast probe that transits a router among the routers and causes the router to perform: upon receiving the loopback multicast probe from a previous hop router, sending, to the previous hop router, a first acknowledgement indicating that the loopback multicast probe was received by the router; forwarding the loopback multicast probe to a next hop router among the routers; and waiting a predetermined time period to receive, from the next hop router, a second acknowledgement indicating that the next hop router received the loopback multicast probe.

In some aspects, the techniques described herein relate to a method, wherein the router is further configured to perform: when the second acknowledgement is not received within the predetermined time period, sending, to the network controller, a failure report indicating that the next hop router failed to acknowledge the loopback multicast probe.

In some aspects, the techniques described herein relate to a method, wherein the router is further configured to perform: when the second acknowledgement is received within the predetermined time period, not sending the failure report.

In some aspects, the techniques described herein relate to a method, wherein the router is further configured to perform: prior to forwarding the loopback multicast probe to the next hop router, including, in the loopback multicast probe, an address of the router as a loopback address for the second acknowledgement.

In some aspects, the techniques described herein relate to a method, wherein the loopback multicast probe includes: a probe type to indicate the loopback multicast probe; and a loopback address of the previous hop router to which the first acknowledgement is to be sent.

In some aspects, the techniques described herein relate to a system including: routers connected in a multicast tree of a multicast network, wherein the routers are configured to forward a multicast flow downstream from a first hop router that is a root of the multicast tree to last hop routers that terminate branches of the multicast tree, respectively; and a network controller coupled to the multicast network and configured to perform: collecting operational configuration information from the routers and constructing a topological view of the multicast tree based on the operational configuration information; causing the routers to forward multicast probes downstream from the first hop router along all of the branches toward the last hop routers to trace the multicast tree; receiving, from particular ones of the last hop routers that received the multicast probes, indications that the multicast probes were received; and detecting failures in the multicast tree based on the indications and the topological view.

In some aspects, the techniques described herein relate to a system, wherein the multicast probes include a multicast probe that, upon transiting a router of the routers, causes the router to perform: upon determining that the router is connected to multiple next hop routers among the routers that start the branches of the multicast tree, replicating the multicast probe to produce multiple replica multicast probes of the multicast probes; and forwarding the multiple replica multicast probes to corresponding ones of the multiple next hop routers to propagate the multiple replica multicast probes along the branches toward the last hop routers.

In some aspects, the techniques described herein relate to a system, wherein the network controller is further configured to perform: commanding the first hop router or a multicast source of the multicast flow that is connected to the first hop router to originate the multicast probe, wherein the router is configured to perform forwarding the multicast probe by forwarding the multicast probe from the first hop router toward the branches.

In some aspects, the techniques described herein relate to a system, wherein a multicast probe among the multicast probes is configured as a loopback multicast probe that transits a router among the routers and causes the router to perform: upon receiving the loopback multicast probe from a previous hop router, sending, to the previous hop router, a first acknowledgement indicating that the loopback multicast probe was received by the router; forwarding the loopback multicast probe to a next hop router among the routers; and waiting a predetermined time period to receive, from the next hop router, a second acknowledgement indicating that the next hop router received the loopback multicast probe.

In some aspects, the techniques described herein relate to a system, wherein the router is further configured to perform: when the second acknowledgement is not received within the predetermined time period, sending, to the network controller, a failure report indicating that the next hop router failed to acknowledge the loopback multicast probe.

In some aspects, the techniques described herein relate to a system, wherein the router is further configured to perform: when the second acknowledgement is received within the predetermined time period, not sending the failure report.

In some aspects, the techniques described herein relate to a system, wherein the router is further configured to perform: prior to forwarding the loopback multicast probe to the next hop router, including, in the loopback multicast probe, an address of the router as a loopback address for the second acknowledgement.

In some aspects, the techniques described herein relate to a system, wherein the loopback multicast probe includes: a probe type to indicate the loopback multicast probe; and a loopback address of the previous hop router to which the first acknowledgement is to be sent.

In some aspects, the techniques described herein relate to non-transitory computer readable media encoded with instructions that, when executed by a processor of a network controller configured to control routers connected in a multicast tree, wherein the routers are configured to forward a multicast flow downstream from a first hop router that is a root of the multicast tree to last hop routers that terminate branches of the multicast tree, respectively, cause the processor to perform: collecting operational configuration information from the routers and constructing a topological view of the multicast tree based on the operational configuration information; causing the routers to forward multicast probes downstream from the first hop router along all of the branches toward the last hop routers to trace the multicast tree; receiving, from particular ones of the last hop routers that received the multicast probes, indications that the multicast probes were received; and detecting failures in the multicast tree based on the indications and the topological view.

In some aspects, the techniques described herein relate to a non-transitory computer readable media, wherein the multicast probes include a multicast probe that, upon transiting a router of the routers, causes the router to perform: upon determining that the router is connected to multiple next hop routers among the routers that start the branches of the multicast tree, replicating the multicast probe to produce multiple replica multicast probes of the multicast probes; and forwarding the multiple replica multicast probes to corresponding ones of the multiple next hop routers to propagate the multiple replica multicast probes along the branches toward the last hop routers.

In some aspects, the techniques described herein relate to a non-transitory computer readable media, further including: at the network controller, commanding the first hop router or a multicast source of the multicast flow that is connected to the first hop router to originate the multicast probe, wherein forwarding the multicast probe includes forwarding the multicast probe from the first hop router toward the branches.

In some aspects, the techniques described herein relate to a non-transitory computer readable media, wherein a multicast probe among the multicast probes is configured as a loopback multicast probe that transits a router among the routers and causes the router to perform: upon receiving the loopback multicast probe from a previous hop router, sending, to the previous hop router, a first acknowledgement indicating that the loopback multicast probe was received by the router; forwarding the loopback multicast probe to a next hop router among the routers; and waiting a predetermined time period to receive, from the next hop router, a second acknowledgement indicating that the next hop router received the loopback multicast probe.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a network controller that is configured to control routers configured to forward a multicast flow downstream from a first hop router that is a root of a multicast tree formed by the routers to last hop routers that terminate branches of the multicast tree, respectively:
collecting operational configuration information from the routers and constructing a topological view of the multicast tree based on the operational configuration information;
causing the routers to forward multicast probes downstream from the first hop router along all of the branches toward the last hop routers to trace the multicast tree;
receiving, from particular ones of the last hop routers that received the multicast probes, indications that the multicast probes were received; and
detecting failures in the multicast tree based on the indications and the topological view.

2. The method of claim 1, wherein the multicast probes include a multicast probe that, upon transiting a router of the routers, causes the router to perform:
upon determining that the router is connected to multiple next hop routers among the routers that start the branches of the multicast tree, replicating the multicast probe to produce multiple replica multicast probes of the multicast probes; and
forwarding the multiple replica multicast probes to corresponding ones of the multiple next hop routers to propagate the multiple replica multicast probes along the branches toward the last hop routers.

3. The method of claim 2, further comprising:
at the network controller, commanding the first hop router or a multicast source of the multicast flow that is connected to the first hop router to originate the multicast probe,
wherein forwarding the multicast probe includes forwarding the multicast probe from the first hop router toward the branches.

4. The method of claim 1, wherein a multicast probe among the multicast probes is configured as a loopback multicast probe that transits a router among the routers and causes the router to perform:
upon receiving the loopback multicast probe from a previous hop router, sending, to the previous hop router, a first acknowledgement indicating that the loopback multicast probe was received by the router;
forwarding the loopback multicast probe to a next hop router among the routers; and
waiting a predetermined time period to receive, from the next hop router, a second acknowledgement indicating that the next hop router received the loopback multicast probe.

5. The method of claim 4, wherein the router is further configured to perform:
when the second acknowledgement is not received within the predetermined time period, sending, to the network controller, a failure report indicating that the next hop router failed to acknowledge the loopback multicast probe.

6. The method of claim 5, wherein the router is further configured to perform:
when the second acknowledgement is received within the predetermined time period, not sending the failure report.

7. The method of claim 4, wherein the router is further configured to perform:
prior to forwarding the loopback multicast probe to the next hop router, including, in the loopback multicast probe, an address of the router as a loopback address for the second acknowledgement.

8. The method of claim 4, wherein the loopback multicast probe includes:
a probe type to indicate the loopback multicast probe; and
a loopback address of the previous hop router to which the first acknowledgement is to be sent.

9. A system comprising:
routers connected in a multicast tree of a multicast network, wherein the routers are configured to forward a multicast flow downstream from a first hop router that is a root of the multicast tree to last hop routers that terminate branches of the multicast tree, respectively; and
a network controller coupled to the multicast network and configured to perform:
collecting operational configuration information from the routers and constructing a topological view of the multicast tree based on the operational configuration information;
causing the routers to forward multicast probes downstream from the first hop router along all of the branches toward the last hop routers to trace the multicast tree;
receiving, from particular ones of the last hop routers that received the multicast probes, indications that the multicast probes were received; and detecting failures in the multicast tree based on the indications and the topological view.

10. The system of claim 9, wherein the multicast probes include a multicast probe that, upon transiting a router of the routers, causes the router to perform:
   upon determining that the router is connected to multiple next hop routers among the routers that start the branches of the multicast tree, replicating the multicast probe to produce multiple replica multicast probes of the multicast probes; and
   forwarding the multiple replica multicast probes to corresponding ones of the multiple next hop routers to propagate the multiple replica multicast probes along the branches toward the last hop routers.

11. The system of claim 10, wherein the network controller is further configured to perform:
   commanding the first hop router or a multicast source of the multicast flow that is connected to the first hop router to originate the multicast probe,
   wherein the router is configured to perform forwarding the multicast probe by forwarding the multicast probe from the first hop router toward the branches.

12. The system of claim 9, wherein a multicast probe among the multicast probes is configured as a loopback multicast probe that transits a router among the routers and causes the router to perform:
   upon receiving the loopback multicast probe from a previous hop router, sending, to the previous hop router, a first acknowledgement indicating that the loopback multicast probe was received by the router;
   forwarding the loopback multicast probe to a next hop router among the routers; and
   waiting a predetermined time period to receive, from the next hop router, a second acknowledgement indicating that the next hop router received the loopback multicast probe.

13. The system of claim 12, wherein the router is further configured to perform:
   when the second acknowledgement is not received within the predetermined time period, sending, to the network controller, a failure report indicating that the next hop router failed to acknowledge the loopback multicast probe.

14. The system of claim 13, wherein the router is further configured to perform:
   when the second acknowledgement is received within the predetermined time period, not sending the failure report.

15. The system of claim 12, wherein the router is further configured to perform:
   prior to forwarding the loopback multicast probe to the next hop router, including, in the loopback multicast probe, an address of the router as a loopback address for the second acknowledgement.

16. The system of claim 12, wherein the loopback multicast probe includes:
   a probe type to indicate the loopback multicast probe; and
   a loopback address of the previous hop router to which the first acknowledgement is to be sent.

17. Non-transitory computer readable media encoded with instructions that, when executed by a processor of a network controller configured to control routers connected in a multicast tree, wherein the routers are configured to forward a multicast flow downstream from a first hop router that is a root of the multicast tree to last hop routers that terminate branches of the multicast tree, respectively, cause the processor to perform:
   collecting operational configuration information from the routers and constructing a topological view of the multicast tree based on the operational configuration information;
   causing the routers to forward multicast probes downstream from the first hop router along all of the branches toward the last hop routers to trace the multicast tree;
   receiving, from particular ones of the last hop routers that received the multicast probes, indications that the multicast probes were received; and
   detecting failures in the multicast tree based on the indications and the topological view.

18. The non-transitory computer readable media of claim 17, wherein the multicast probes include a multicast probe that, upon transiting a router of the routers, causes the router to perform:
   upon determining that the router is connected to multiple next hop routers among the routers that start the branches of the multicast tree, replicating the multicast probe to produce multiple replica multicast probes of the multicast probes; and
   forwarding the multiple replica multicast probes to corresponding ones of the multiple next hop routers to propagate the multiple replica multicast probes along the branches toward the last hop routers.

19. The non-transitory computer readable media of claim 18, further comprising:
   at the network controller, commanding the first hop router or a multicast source of the multicast flow that is connected to the first hop router to originate the multicast probe,
   wherein forwarding the multicast probe includes forwarding the multicast probe from the first hop router toward the branches.

20. The non-transitory computer readable media of claim 17, wherein a multicast probe among the multicast probes is configured as a loopback multicast probe that transits a router among the routers and causes the router to perform:
   upon receiving the loopback multicast probe from a previous hop router, sending, to the previous hop router, a first acknowledgement indicating that the loopback multicast probe was received by the router;
   forwarding the loopback multicast probe to a next hop router among the routers; and
   waiting a predetermined time period to receive, from the next hop router, a second acknowledgement indicating that the next hop router received the loopback multicast probe.

* * * * *

UNITED STATES PATENT AND TRADEMARK OFFICE
CERTIFICATE OF CORRECTION

| | | |
|---|---|---|
| PATENT NO. | : 12,301,404 B2 | Page 1 of 1 |
| APPLICATION NO. | : 18/065221 | |
| DATED | : May 13, 2025 | |
| INVENTOR(S) | : Mankamana Prasad Mishra et al. | |

It is certified that error appears in the above-identified patent and that said Letters Patent is hereby corrected as shown below:

On the Title Page

Item (12), should read:
Mishra et al.

Item (72) Inventors:
Please change "Mankamana Mishra Prasad" to --Mankamana Prasad Mishra--

Signed and Sealed this
Thirtieth Day of September, 2025

John A. Squires
*Director of the United States Patent and Trademark Office*